April 18, 1961 R. J. HARKENRIDER 2,980,472
LUBRICATOR FOR TRACTION MOTOR SUSPENSION BEARINGS
Filed April 10, 1959 5 Sheets-Sheet 1

Fig.1.

Inventor
Robert J. Harkenrider
By Mann, Brown & McWilliams
Attys.

United States Patent Office
2,980,472
Patented Apr. 18, 1961

2,980,472
LUBRICATOR FOR TRACTION MOTOR SUSPENSION BEARINGS

Robert J. Harkenrider, Winona, Minn., assignor to Gladys D. Miller, Winona, Minn.

Filed Apr. 10, 1959, Ser. No. 805,408

13 Claims. (Cl. 308—132)

My invention relates to a lubricator for traction motor suspension bearings, and more particularly, to lubricator units adapted for use in the axle cap of such bearings for the purpose of conducting lubricant from the axle cap lubricant reservoir to the journal.

Lubricator units of the type to which my invention relates are composed of a lubricating wick suspended by a carrier assembly. The wick lifts, by capillary action, lubricant from the oil reservoir of the axle cap and applies it to the axle journal through a window opening formed in the bearing assembly at one side thereof.

Lubricating wicks for lubricators of this type have in the past been in the form of a felt body provided with a thickened upper portion formed with an arcuate surface that is complementary to that of the journal which it engages, and a depending projection which extends from the thickened portion into the oil reservoir of the axle cap to supply the oil to the thickened portion. See, for instance, my Patent No. 2,708,611, granted May 17, 1955. Such lubricating wicks or bodies are conventionally mounted in or are supported by a holder that is suspended in the axle cap by a carrier assembly which includes springs or the like to bias the wick or lubricating body against the journal.

These lubricating bodies are customarily formed from felt material, and since it is commercially difficult to make a felt wick having sufficient area to cover the surface of the journal exposed by the window opening of the bearing, the lubricator body has been customarily supplied in the form of a group of felt bodies secured together, for instance, in the manner suggested in my above mentioned patent, as well as by earlier Patent No. 2,640,741, granted June 2, 1953. Experience has shown that the application of lubricant to the journal affected by these composite lubricating bodies is not as uniform longitudinally of the journal as it should be because of the joints, between the felt bodies making up the composite body, where capillary action is at a minimum. Consequently, the composite lubricating bodies had to have an applicator surface that was of sufficient dimension transversely of the journal to insure acceptable distribution of the oil transmitted to the journal.

A principal object of this invention is to provide a lubricator unit employing a simplified one-piece lubricating wick that may be of minimum dimension transversely of the journal and thereby permits reduction in the size of the bearing assembly window opening while still insuring maximum application of lubricant over the width of the window opening.

A further principal object of this invention is to provide an improved carrier assembly for lubricating wicks or bodies of the type described above which insures that the applicator surface of the wick moves only perpendicularly of the journal surface, yet which permits sufficient sidewise movement of the wick to insure good journal contact.

Further objects of the invention are to provide a lubricator unit that permits ready replacement of the wicking assembly without removing the carrier assembly from the axle cap cover (that ordinarily carries these lubricator units), and to provide a lubricator unit that is economical of manufacure, convenient to install, and readily adapted for use in connection wtih existing traction motor suspension bearing assemblies.

Other objects, uses and advantages will be obvious or become apparent from a consideration of the following detailed description and the application drawings.

General description

Figure 1:
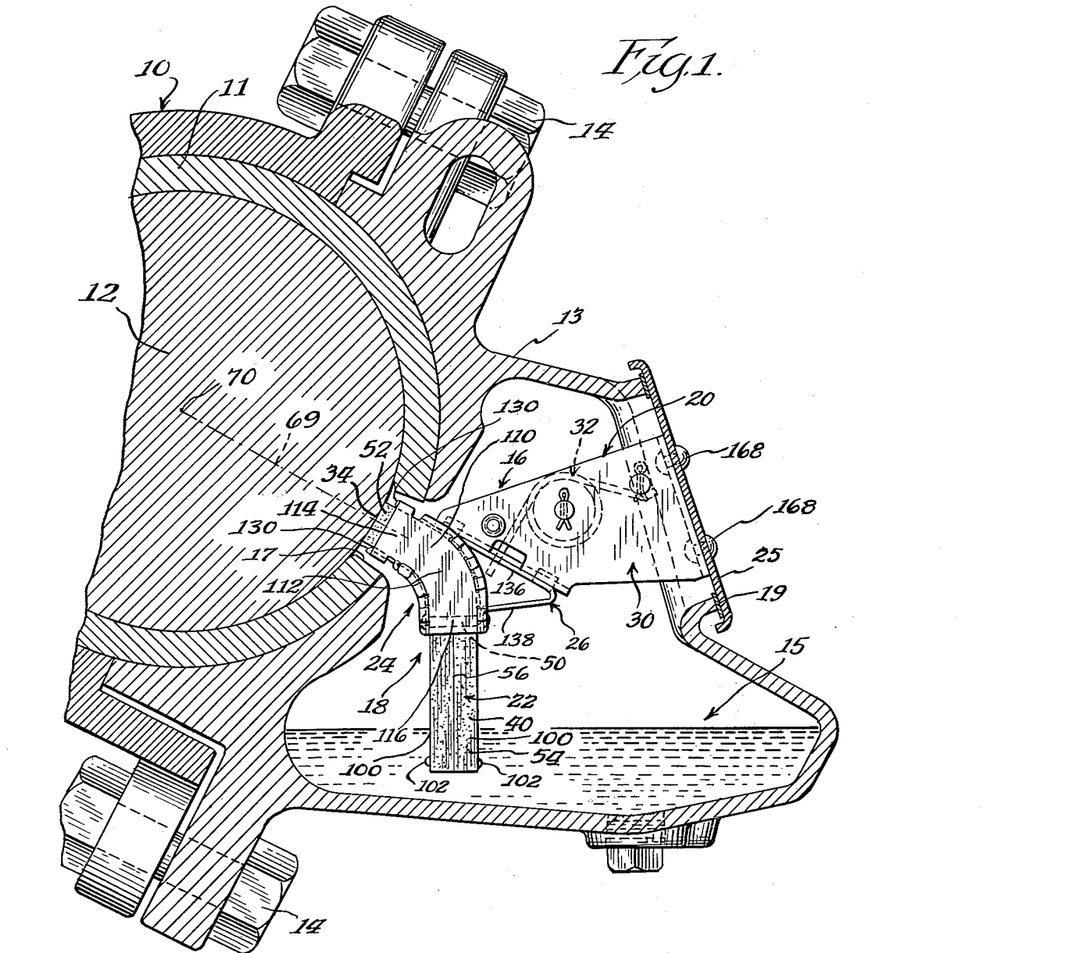
Figure 1 is a transverse vertical section through a motor suspension bearing and the axle to which the bearing is applied, showing in elevation a lubricator assembly employing one embodiment of my invention.

Reference numeral 10 of Figure 1 generally indicates a familiar form of traction motor suspension bearing provided with a liner or shell 11 forming the actual bearing for the wheel axle 12. Associated with these is a motor suspension bearing cap or axle cap 13 secured to the motor suspension bearing by bolts 14 and provided with an oil reservoir 15.

The improved lubricator unit or assembly is generally indicated at 16 and is employed to lift oil from the reservoir 15 and apply it to the axle 12 through the window opening 17 in the shell or liner 11.

The lubricating unit or assembly 16 comprises a wick assembly 18 that is suspended from a carrier assembly 20 which is in turn secured to the cover plate 25 of the axis cap. Cover plate 25 is customarily secured in place by appropriate bolts (not shown), seal 19 being applied between the cover plate and the axle cap.

The wick assembly 18 comprises a lubricating body or wick 22 received in a tubular housing, trough, or holder member 24 that includes a slide member 26 which is mounted on trackways 28 (see Figure 2) formed by side support members 30 of the carrier assembly. The wick assembly is biased in the direction of the window opening 17 by torsion springs 32 to press the applicator surface 34 of the lubricating body 22 against the axle journal.

The lubricating body or wick 22 is preferably of the type described in my copending application Serial No. 805,407, filed April 10, 1959, the disclosure of which is hereby incorporated by reference in interests of brevity. Generally speaking, the lubricating body 22 comprises a block-like body 40 (see Figure 2b) which initially is of generally right angled parallelepiped configuration, and may be stamped from a blank of felt sheeting or cut from a roll of felt having the proper width. The block-like body 40 is thus in the form of an elongate or oblong strip of felt material having a rectangular transverse cross-sectional configuration. Preferably, but not necessarily, the felt material from which the body 40 is formed is of the type employing alternating layers 42 and 44 (see Figure 2) of felt and woven fabric. The woven fabric 44 is preferably composed of high capillary strands in the form of a plain basket weave, such as that employed in making one form of lubricating wick disclosed in my said Patent No. 2,708,611. The felt and fabric of such a material are pressed together so that the sheeting is a unitary mass held together by the felt fibers felting together through the mesh of the fabric material. However, plain or regular felt will provide bodies 40 suitable for the purposes of this invention.

Figures 2, 2A, 2B:
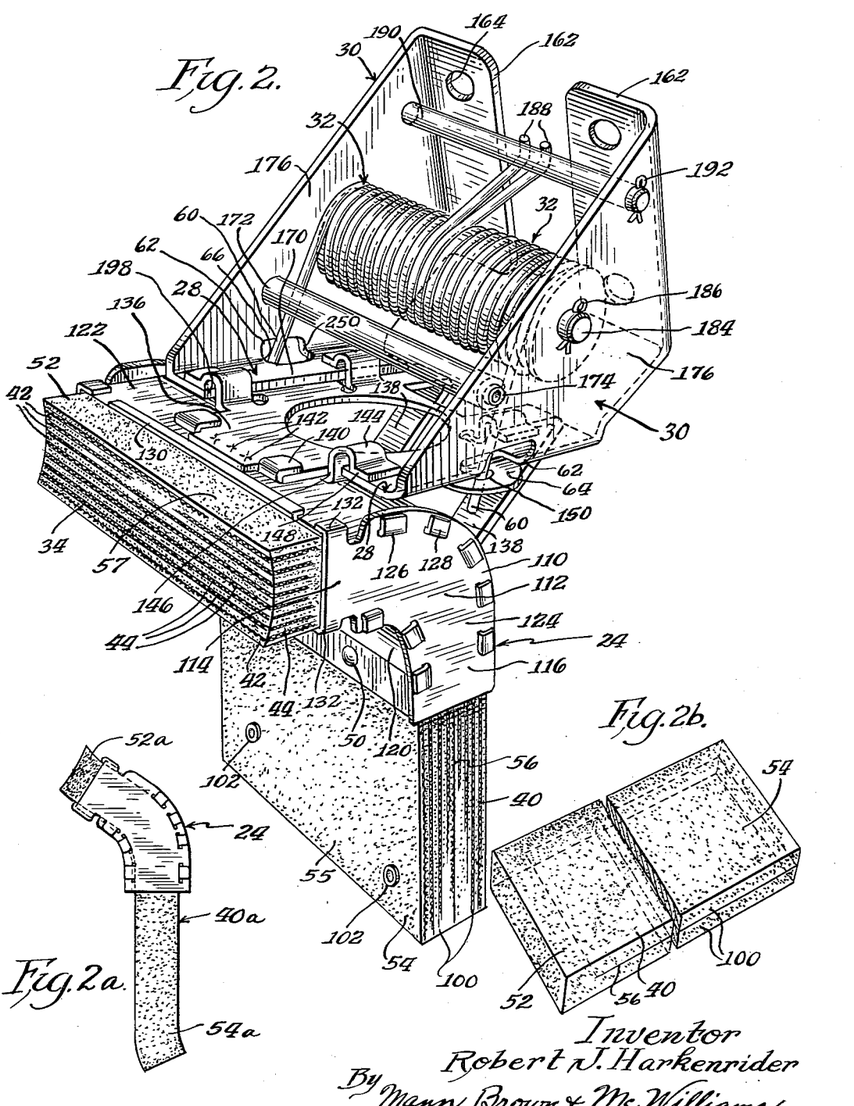
Figure 2 is a diagrammatic perspective view of the lubricator assembly or unit shown in Figure 1.
Figure 2a is a diagrammatic plan view illustrating an alternate form of wick assembly that may be employed with the unit of Figures 1 and 2.
Figure 2b is a small scale perspective view of the lubricating wick per se before applied to its holder.
Figures 3, 4:
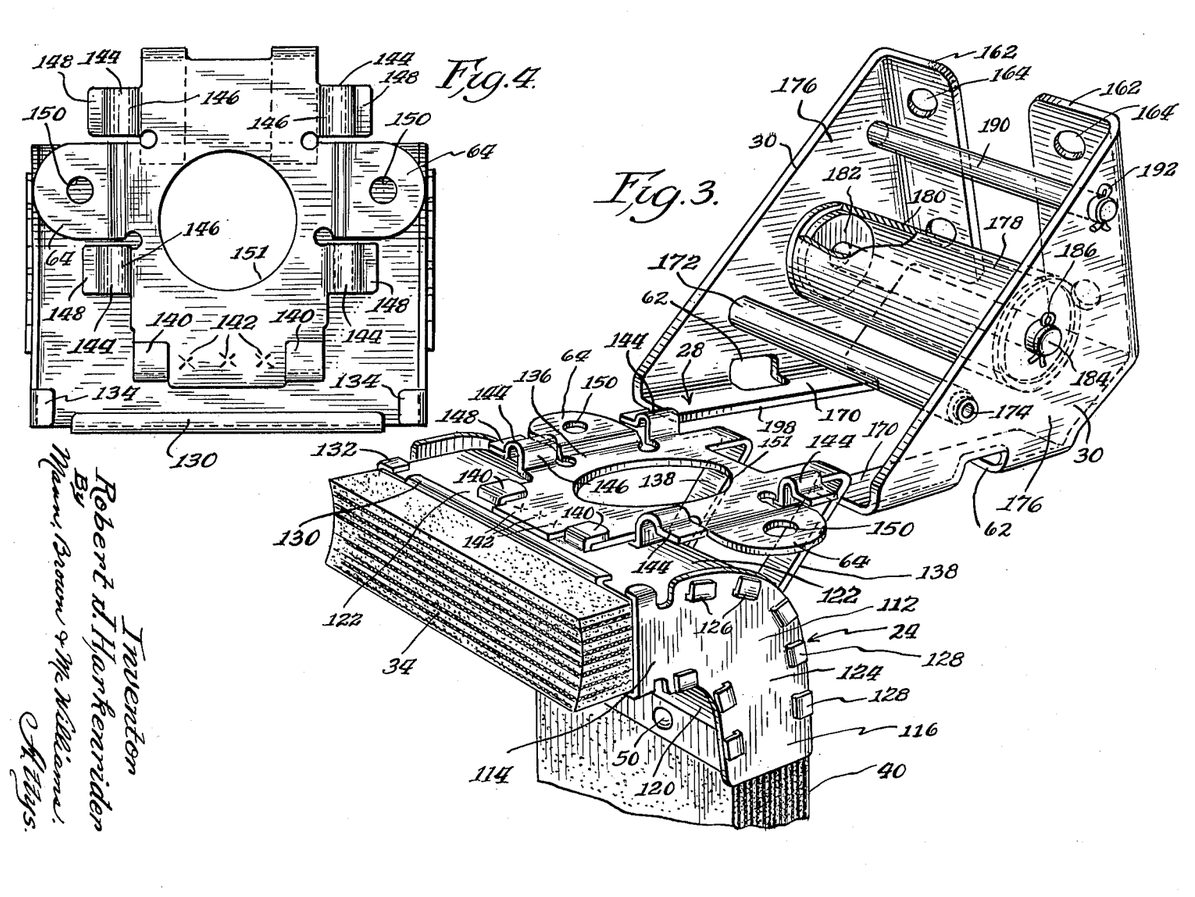
Figure 3 is a diagrammatic perspective view of the unit shown in Figure 2, but showing the wick assembly displaced from the carrier assembly and parts of the carrier assembly broken away and omitted for clarity of illustration.
Figure 4 is a top plan view of the wick or lubricating body holder of Figures 1–3.

Bodies 40 after being cut to size are formed at one end thereof with arcuate applicator surface 34 in any suitable manner, after which they are applied to the tubular holder member 24 to substantially the position shown in Figures 1 and 2, the body 40 being secured in place within the holder 24 by appropriate rivets 50 (two being employed symmetrically positioned, though only one is shown).

The holder member 24 provides the block or body 40 with the bend required to dispose the end 52 thereof within the window opening 17 while positioning the end 54 thereof in the reservoir 15.

It will be noted that the block or body 40 is bent by the holder member 24 so that convex and concave surfaces are formed in the wide sides 55 and 57 of the wick. To facilitate bending of the relatively thick body 40, the body may be slit or bisected as at 56 (see Figures 2 and 2b) parallel to layers 42 and 44 from the ends 54 thereof as far as necessary to include the portion of the body that is to be disposed within the arcuate portion of holder 24 (this is more fully described in my copending application Serial No. 805,407 filed April 10, 1959, to which reference may be made for a more complete description of such processing of the wick). Alternately, the lubricating block or body need not be slit, though it will appear somewhat as indicated at 40a in Figure 2a when received in holder 24, and the end 52a should be formed to eliminate as much as possible distortion of the applicator surface of the upper curled end 52a. The compression and tension forces at the concave and convex sides of the body 40a, after the body has been inserted in holder 24, tend to restore or urge the body to its initial rectilinear or flat condition (that of Figure 2b) which results in the curved ends diagrammatically illustrated in Figure 2a. The lower end 54a of the block or body 40a may be employed without correcting its shape.

Where body 40 is slit prior to insertion in its holder, the layers or laminations thus formed are afterwards fixed together, as hereinafter described.

As clearly shown in Figure 2, the torsion springs each include a spring arm 60 which projects through an opening 62 formed in each trackway 28 and engages an ear or wing 64 of the wick assembly carrier member 26. The openings 62 define the limits of movement of the wick assembly along the trackways 28, and when the arms 60 engage the forward sides 66 of these openings, the forward movement of the wick assembly toward the journal is stopped, as is the biasing action of the torsion springs on the wick assembly.

It will be observed from Figures 1 and 2 that the trackways 28 extend transversely of the journal and are disposed so that the applicator surface 34 will move along a path that is perpendicular to the journal and along a radius 69 extending from the central axis 70 of the journal.

Figure 5:
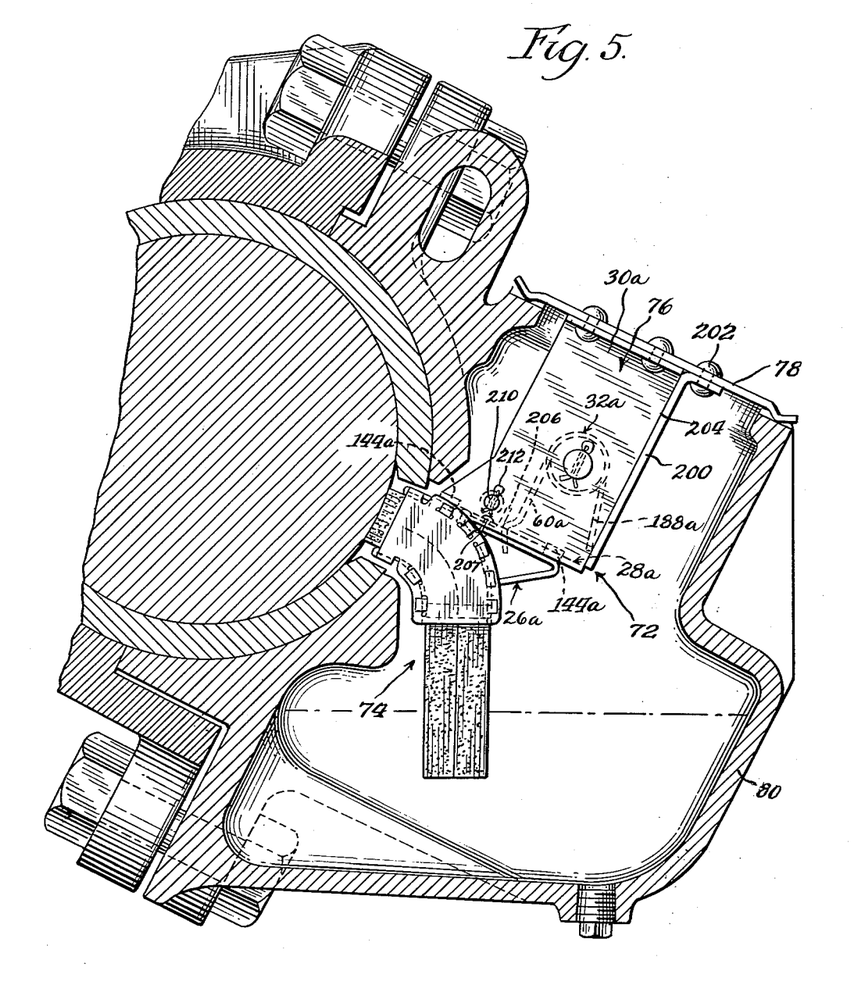
Figure 5 is a view similar to that of Figure 1, but showing an embodiment of my invention applied to a different form of axle cap.

In the embodiment of Figure 5, the lubricator unit 72 includes wick assembly 74 suspended by carrier assembly 76 that is secured to cover plate 78 of a modified axle cap 80 (cover plate 78 is fixed in position by appropriate bolts that are not shown). The principal difference between the units 72 and that shown in Figures 1–4 is in the shape of the carrier assembly 76 that is needed to employ same in connection with the modified axle cap 80.

Figure 6:
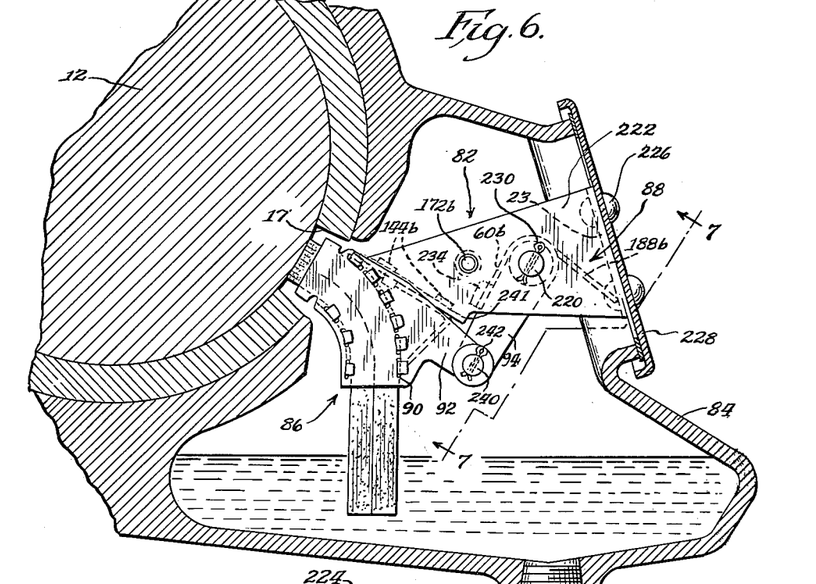
Figure 6 is a view similar to that of Figure 1, but illustrating a modified form of the invention.
Figure 7:
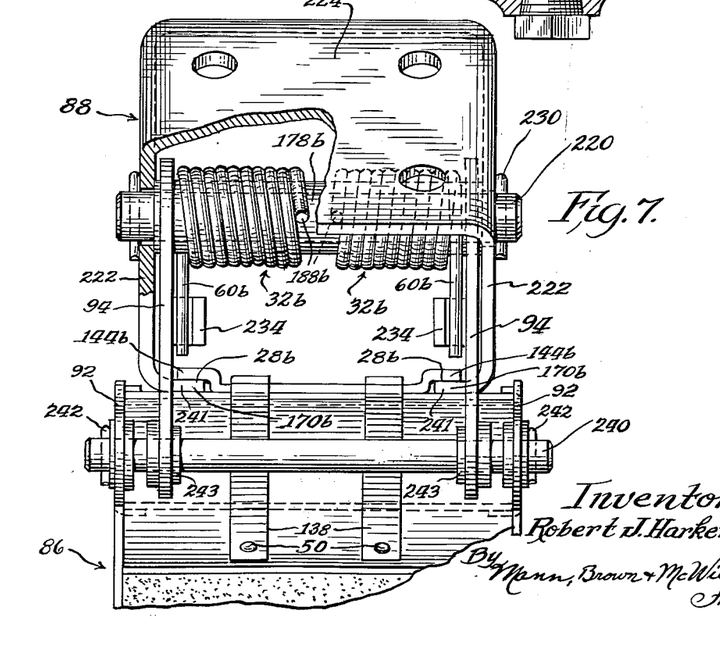
Figure 7 is a view approximately along line 7—7 of Figure 6, parts being broken away to facilitate illustration.

In the embodiment of Figures 6 and 7, a lubricator unit 82 is shown applied to axle cap 84 which is of the type shown in Figure 1. The lubricator unit 82 includes wick assembly 86 and carrier assembly 88, both of which are similar to the corresponding assembly of the embodiment of Figure 1 except that the holder member 90 of the wick assembly 86 includes a pair of rearwardly projecting arms 92 to which levers 94 are pivotally secured, levers 94 being pivotally carried by the carrier assembly 82 and engaged by the springs 32b of the carrier assembly to bias the wick against the axle 12.

It will thus be seen that I have provided a simplified lubricating unit including a lubricating body that is inexpensively manufactured and permits a window opening of reduced size in the bearing 12. Since the lubricating body or wick is for all practical purposes a single unitary body presenting a unitary applicator surface 34 across the width of the window opening of the bearing, an improved oil applicator action is provided which permits a reduction in circumference of the journal surface needed to be in contact with the wick. The carrier assembly is simplified in form and positively insures that forward movement of the lubricator wick as well as the biasing action on the wick will be stopped after the applicator end of the wick wears away a predetermined amount.

*Specific description*

The lubricating body 40, when split as at 56 to facilitate bending of the body, is formed into a pair of laminations or layers 100 which desirably should be secured together for stability during use. This may be done either by securing these ends together with spaced rivets 102, or by applying an oil resistant adhesive along the split portion 56 before the body is applied to the holder 24 (after the body 40 has been bent to the configuration illustrated, the adhesive is allowed to "set"). Bending of the body 40 will effect a longitudinal displacement of the ends of layers or laminations 100 at end 54 of the wick, and these should be trimmed to even up these ends approximately as indicated in Figure 1. Slit 56 is preferably made parallel to the layers 42 and 44 of the body, which, as indicated in Figure 2, extend longitudinally of the applicator surface 34 and thus of the journal of axle 12. Slit 56 may extend from end 54 of the body all the way to end 52, or merely through the portion of the body that is to be bent (as herein shown), as described in my said copending application. In either case, for all practical purposes, the lubricating body or wick presents a unitary applicator surface 34 to the window opening 17. Surface 34, which is made complementary to the surface of the journal, may be formed in any suitable manner during the processing of wick body 40.

The holder member 24 includes tubular member 110 (see Figures 2 and 3) formed to define the central curvilinear portion 112 and the rectilinear end portions 114 and 116. The curvilinear portion 112 of the holder member bends the lubricating body 40 to the configuration desired, while the rectilinear portions effect a holding and bracing action on the adjacent portions of the lubricating body. The tubular member 110 in the illustrated embodiment comprises a bottom or lower member 120, a top or upper member 122, and spaced side members 124. The individual side members 124 are formed with openings 126 to receive tabs 128 with which the lower and upper members 120 and 122 are formed for purposes of securing these elements together to form the tubular member 110. The lower member 120 and the upper member 122 at the end of the rectilinear portion 114 of the holder member are each formed with appendages 130 which are turned back over the respective members for reinforcing purposes. The side members 124 are formed with tabs 132 that are turned against the respective upper and lower members 120 and 122 for reinforcing purposes.

The slide member 26 comprises (in the embodiment of Figures 1–4) a planar strip 136 of rigid material formed with legs or extensions 138 that are bent substantially to the configuration indicated in Figure 1 and secured in place by the rivets 50 which pass through the tubular member 110 to secure the lubricating body in place. Rivets 50 pass through tubular member 110 and the body 40.

Strip or plate 136 at the forward end of the lubricator is fixed to the tubular member 110 by tabs 140 (formed in holder top member 122) and spaced spot welds 142. Strip or plate 136 includes laterally extending fingers 144 which define hanger members for supporting the wick assembly on the trackways 28. The fingers 144 each include an upright portion 146 and a laterally extending portion 148, the latter slidably engaging trackways 28. The plate or strip 136 also includes laterally extending wings 64 which are perforated as at 150 to receive the ends of the respective spring arms 60 and lightening hole 151.

The carrier assembly of the embodiment of Figures 1–4 generally comprises spaced side members 30 which include laterally extending flanges 162 formed with appropriate perforations 164 that receive rivets 168 which fix these support members to the axle cap cover plate 25. Support members 30 also include laterally extending flanges 170 which form the trackways 28 on which the wick assembly is mounted. At their forward ends, the support members 30 are held in spaced relation by spacer pin 172 secured in place by appropriate rivets 174 applied through perforations formed in the walls 176 of the respective support members 30.

Torsion springs 32 are removably mounted in place by being received over bushing 178 which is proportioned to fit between the walls 176 of support members 160. Bushing 178 comprises a tubular cylinder member 180 (see Figure 3) closed at its ends by cup-shaped discs 182 which are received over a retainer pin 184 so proportioned that its ends extend outwardly of the walls 176 of the support members to receive in each end thereof appropriate securing devices such as cotter pins 186. The arms 188 of the torsion springs bear against spring pin 190 that extends between the walls 176 of the support members and is secured in place as by appropriate cotter pins 192.

In accordance with my invention, the wick assembly and the carrier assembly are so arranged that the wick assembly may have limited twisting movement with respect to the carrier assembly to obtain good journal contact if some misalignment should exist between the journal and the carrier assembly. In the illustrated embodiments, this is achieved by spacing the upright portions 146 of the forward carrier member fingers 144 relatively close to the edges 198 of the support member flanges 170, while spacing the upright portions 146 of the rearward fingers 144 somewhat further away from such edges 198. This will result in the upright portions 146 of the rearward fingers 144 being somewhat closer together (see Figure 4). Thus, the wick assembly may twist somewhat with respect to the carrier assembly approximately about a center in alignment with the forward fingers 144 which means that very little movement of the applicator surface 34 of the lubricating body is required to achieve the positioning desired.

The embodiment of Figure 5 is quite similar to that of Figures 1–4 though the carrier assembly 72 employs spaced support members 30a which are shaped somewhat differently because of the different type of axle cap employed. In this embodiment of the invention, the spring pin 190 is omitted and a base plate 200, fixed to the axle cap cover 78 as by appropriate rivets 202, extends between the rearward edges 204 of the support members 160a. The arms 188a of the torsion springs 32a bear against base plate 200, while arms 60a bear against spaced angle members 206 that are fixed to either side of plate 136a of wick assembly carrier member 26a, as by appropriate rivets 207. In this embodiment of the invention, the wings 64 of the carrier member are omitted as are perforations 62 in the trackways of support members 160a, the angle members 206 abutting against stop pin 210 when the wick of the unit shown in Figure 5 has worn away a predetermined amount (of course, spring arms 60a are positioned between the side edges of trackways 28a). Pin 210 is secured between support members 160a by appropriate cotter pins 212.

The embodiment of Figure 5 is otherwise substantially the same as the embodiment of Figures 1–4, it including trackways 28a on which fingers 144a engage to suspend the wick assembly 74 from the carrier assembly 76.

In the embodiment of Figures 6 and 7, the levers 94 are pivoted by pin 220 on which the torsion springs 32b are mounted. The bushing 178b is proportioned to receive the respective levers between the support members 222 and the respective torsion springs 32b. In this embodiment of the invention, the support members 222 are integrally united by a web portion 224 which is formed with appropriate perforations to receive rivets 226 that secure the support members to axle cap cover 228 of the axle cap 84. Bushing 178b is similar in construction to bushing 178, pins 220 being held in place by cotter pins 230. Arms 188b of torsion springs 32b bear against the inner surface 232 of web portion 224, while spring arms 60b bear against hooked projections 234 of the respective levers 94. Support members 222 are secured in spaced relation by spacer pin 172b and include flanges 170b forming trackways 28b on which the wick assembly rides. The wick assembly 86 aside from arms 92, has substantially the same structural features as the embodiment of Figures 1–4, its slide member 26b including fingers 144b that ride on trackways 28b. Pin 240 pivotally secures the respective levers 94 to the respective arms 92, pin 240 being secured in place by appropriate cotter pins 242.

Referring to Figure 7, it will be noted that levers 94 are in alignment with trackways 28b, the rear ends 241 thereof forming positive stops that limit forward movement of the wick assembly with the same results as described above. Levers 94 may pivot on suitable bearings 243 carried by pin 240.

All of the illustrated embodiments function in substantially the same manner. The lubricator units together with an axle cap cover plate may be furnished as a complete assembly and applied to the axle cap merely by inserting the lubricator components into the axle cap through its access opening and then bolting the cover plate in place in the customary manner. In the embodiment of Figures 1–4, the spring arms will be positioned adjacent the rear edges 250 of openings 62 formed in trackways 28 and as the applicator surface 34 wears away, the spring arm 60 will advance toward the forward edge 66 of these openings. In the embodiment of Figure 5, the spring arms 60a will initially be positioned somewhat as shown, advancing forwardly or to the left of Figure 5 as the applicator surface 34 wears away. The device of Figure 6 is shown substantially at the midpoint of the useful life of the lubricating wick (at which point levers 94 are perpendicular to the plane of trackways 26b), the levers 94 pivoting clockwise about pin 220 as the applicator surface wears away.

Of course, the carrier assembly together with the axle cover cap and the wick assembly may be, and preferably are, furnished as separate assemblies, and after being secured together, applied to the axle cap as described above. The wick assembly is particularly adapted for sale as a replacement part since, in all embodiments of the invention, the wick assembly may be replaced merely by removing the bushings on which the torsion springs are mounted. In the embodiment of Figure 1, this is facilitated by first removing spring pin 190.

It will thus be seen that I have provided a lubricator unit of simplified construction employing a lubricating wick or body that permits the use of inexpensively made die structures and is of minimum dimension vertically of the bearing window opening or transversely of the journal while providing a maximum lubricating action across the width of the window opening. Thus, the window opening of the bearing may be correspondingly reduced in size. The wick assembly moves only perpendicularly of the journal surface and along a radius of the axle, which prevents edge wear of the applicator surface as a result of journal rotation. The particular spacing of the holder member fingers that suspend the wick assembly from the carrier assembly permits sufficient sidewise movement to insure good journal contact in the event that some misalignment between the carrier assembly and the journal should exist.

Since the applicator surface 34 is unbroken longitudinally of the journal, a uniform oil film is applied to the journal even though the lubricating body is relatively narrow vertically of the window opening. The positioning of layers 42 and 44 longitudinally of the axis, in accordance with my Patent No. 2,768,035, materially improves the lubricating action provided by the wick assembly.

The wick structure described and claimed in my said copending application is preferred for use in the lubricator unit herein disclosed, though the wick shown in Figure 2a will operate with sufficient effectiveness to provide satisfactory lubrication.

Lubrication bodies 40 in a successful embodiment of the invention are on the order of eight inches long, four inches wide, and one inch thick. The lubricating body holders bend the lubricating bodies over an angle on the order of sixty degrees on a radius measuring one inch at the concave side of the body. Rectilinear portions 114 and 116 of the holder are on the order of ¾ inch long, and the end 52 of the lubricating body should initially project about ½ inch from the forward end of member 110. Surface 34 is struck on a radius of 4½ inches, which is the radius of journal 12 to which the illustrated embodiments are applied. The remainder of the components of the invention may be proportioned in accordance with good engineering practice, and it should be appreciated that the dimensions given are exemplary only; for instance, the bodies 40 may be on the order of six inches wide and 1¼ inches thick, with the remainder of the lubricator components being changed proportionately.

The foregoing description and the drawings are given merely to illustrate and explain my invention and the invention is not to be limited thereto, except insofar as the appended claims are so limited, since those skilled in the are who have my disclosure before them will be able to make modifications and variations therein without departing from the scope of the invention.

I claim:

1. A lubricator device for applying lubricant to a rotatable journal from a lubricant reservoir, said lubricator device comprising spaced support members each including a trackway that extends transversely of the journal when the lubricator device is mounted in operative relation to the journal, a lubricator body holder mounted on said trackways for movement toward and away from the journal when the lubricator device is mounted in operative relation to the journal, a lubricator body carried by said holder, resilient means for biasing said holder for movement toward the journal when the lubricator device is mounted in operative relation to the journal, said resilient means comprising spaced spring arms engaging said holder, said spring arms extending through openings in the respective trackways, the end of said lubricator body positioned adjacent the journal when the lubricator device is mounted in operative relation to the journal sufficiently extending from said holder so that when said body is placed in contact with the journal, said spring arms are spaced from the rims of the respective openings in said trackways, whereby said openings function as stop means to simultaneously limit the movement of said holder toward said journal and said biasing action of said arms on said holder when the lubricator device is mounted in operative relation to the journal and when said lubricator body has worn away a predetermined amount.

2. A lubricator device for applying lubricant to a rotatable journal from a lubricant reservoir, said lubricator device comprising spaced support members each including a trackway that extends transversely of the journal when the lubricator device is mounted in operative relation to the journal, a lubricator body holder mounted on said trackways for movement toward and away from the journal when the lubricator device is mounted in operative relation to the journal, a lubricator body carried by said holder, resilient means for biasing said holder for movement toward the journal when the lubricator device is mounted in operative relation to the journal, said resilient means comprising a pair of torsion springs, each of said springs including an arm engaging said holder, said arms extending through openings formed in the respective trackways, and the other arms thereof engaging abutment means carried by said support members, the end of said lubricator body adjacent the journal, when the lubricator device is mounted in operative relation to the journal, sufficiently extending from said holder so that when said body is in contact with the journal, the first mentioned arms are spaced from the rims of the respective openings in said trackways, said springs being removably mounted whereby said lubricator body and holder may be removed and replaced upon removing said springs.

3. A lubricator device for applying lubricant to a rotatable journal from a lubricant reservoir, said lubricator device comprising spaced support members each including a trackway that extends transversely of the journal when the lubricator device is mounted in operative relation to the journal, a lubricator body holder mounted on said trackways for movement toward and away from the journal when the lubricator device is mounted in operative relation to the journal, a lubricator body carried by said holder, resilient means for biasing said holder for movement toward the journal when the lubricator device is mounted in operative relation to the journal, said holder including forward and rearward pairs of hanger members slidably engaging the respective trackways, said hanger members including movement guiding portions disposed adjacent longitudinally extending edges of the respective trackways, with said portions of the rearward pair of hanger members being disposed to permit greater lateral movement of said holder with respect to said trackways than the forward pair of hanger members will, whereby a limited twisting movement of said holder between said trackways is permitted to allow the lubricator body to position itself flush against the journal, under the biasing action of said resilient means, with minimum lateral movement of the forward end of said lubricator body, when the lubricator device is mounted in operative relation to the journal.

4. A lubricator device for applying lubricant to a rotatable journal from a lubricant reservoir, said lubricator device comprising spaced support members each including a trackway that extends transversely of the journal when the lubricator device is mounted in operative relation to the journal, a lubricator body holder mounted on said trackways for movement toward and away from the journal when the lubricator device is mounted in operative relation to the journal, a lubricator body carried by said holder, and resilient means for biasing said holder for movement toward the journal when the lubricator device is mounted in operative relation to the journal, said holder comprising a tubular substantially sector shaped member receiving said lubricator body, said lubricator body comprising a block-like body received within the bore of said holder, said holder carrying spaced pairs of hanger members slidably engaging said trackways to movably mount said holder on said trackways, when the lubricator device is mounted in operative relation to the journal.

5. A lubricator unit for traction motor suspension bearings provided with an axle cap having an oil reservoir in its lower portion and a window opening above the reservoir, said unit comprising a cover plate adapted to removably close said opening when said unit is applied in operative relation to the axle cap, a pair of spaced support members secured to said cover plate, each of said support members including a trackway adapted to extend transversely of the axle journal when said unit is applied in operative relation to the axle cap, a lubricator body holder slidably mounted on said trackways for movement toward and away from the journal when said unit is applied in operative relation to the axle cap, a block-like lubricator body carried by said holder, said body comprising an elongate strip of felt material of generally parallelepiped configuration and having a rectangular transverse cross-sectional configuration, said body being positioned with respect to said holder so that one end of said body is adapted to extend through the window opening of the bearing and into contact with the journal, the other end of said body is adapted to extend into the oil reservoir, and the long dimensions of said transverse cross-sectional configuration of said body are disposed longitudinally of the journal when said unit is applied in operative relation to the axle cap, said body being unbroken longitudinally of its transverse cross-sectional configuration, and resilient means for biasing said one end of said body into contact with the journal when said unit is applied in operative relation to the axle cap.

6. The unit set forth in claim 5 wherein said holder comprises an arcuate tubular member proportioned to closely engage said body, said tubular member deforming said body as required to position said one end thereof in the bearing window opening and flush against the journal under the biasing action of said resilient means when said unit is applied in operative relation to the axle cap.

7. The unit set forth in claim 5 wherein said resilient means comprises a pair of spring arms connected to said holder, said spring arms extending through perforations formed in the respective trackways and engaging said holder.

8. The unit set forth in claim 5 wherein said resilient means comprises a pair of spring arms connected to said holder, and a pair of levers pivotally connected at like ends to said support members, said levers being pivotally connected to said holder at their other end and said spring arms engaging said levers.

9. A holder for a block-like lubricating body, said holder comprising a tubular member proportioned to closely receive said body, said tubular member including a curvilinear central portion and rectilinear end portions from which the body extends, and a slide member fixed to the convex side of said tubular member, said slide member comprising a strip of rigid material fixed to said tubular member and being formed with laterally projecting fingers for slidably mounting same on a stationary support.

10. A lubricator for traction motor suspension bearings wherein a bearing supported by an axle cap in intimate contact with a journal has a relatively long narrow rectangular opening therein extending parallel to the journal axis, said lubricator comprising a support structure adapted for attachment to said axle cap, a lubricating pad for conveying oil carried by said axle cap to said journal when said lubricator is applied in operative relation to the journal, said pad including an elongate body of substantially uniform rectangular cross-sectional thickness, one end of said pad being slightly smaller in cross-section than said opening in said bearing for movement therethrough when said lubricator is applied in operative relation to the journal, said one end of said pad having an arcuate surface adapted for contact with the journal when said lubricator is applied in operative relation to the journal, said pad being arcuately bent about an axis parallel to said journal axis when said lubricator is applied in operative relation to the journal to enable the end opposite said one end to extend into the oil carried by said cap when said lubricator is applied in operative relation to the journal, means mounting said pad on said support structure for movement in a direction substantially perpendicular to the circumference of said journal to place the arcuately surfaced end in contact with said journal when said lubricator is applied in operative relation to the journal, and resilient means operatively connected to said pad for biasing it toward said journal when said lubricator is applied in operative relation to the journal.

11. A lubricator arrangement for a traction motor suspension axle journal bearing comprising an axle cap having an oil reservoir in its lower portion and a window opening above the reservoir providing access to the axle journal when the axle cap is applied in operative relation to the bearing, and a lubricator device comprising an elongate lubricating pad having a generally uniform rectangular transverse cross-sectional configuration, means for supporting said pad within said axle cap adjacent said window opening with one end thereof positioned in alignment with the window opening, and with the long dimensions of said transverse cross-sectional configuration of said pad extending longitudinally of the journal when said axle cap is applied in operative relation to the bearing, said pad being bent about an axis that is parallel to the axis of the journal when said axle cap is applied in operative relation to the bearing to dispose the other end thereof within the oil reservoir when said axle cap is applied in operative relation to the bearing, and means for biasing said one end of said body into contact with the journal when said axle cap is applied in operative relation to the bearing.

12. A lubricator subassembly comprising an elongate body of capillary material of generally rectangular transverse cross-sectional configuration, and a holder therefor, said holder comprising a tubular member including a curvilinear central portion and rectilinear end portions, said body being received in said holder and said tubular member being proportioned to closely receive said body and curving to define concave and convex surfaces in the respective wide sides of said body, and a slide device secured to said tubular member at the convex side thereof, said slide device comprising spaced rigid laterally projecting fingers secured to said tubular member for slidably mounting same on a stationary support.

13. A lubricator device for applying lubricant to a rotatable journal from a lubricant reservoir below the journal, said lubricator device comprising support means for defining a supporting trackway that extends transversely of the journal when the lubricator device is mounted in operative relation to the journal, a lubricator body holder adapted to be mounted on said trackway for movement toward and away from the journal, when the lubricator device is mounted in operative relation to the journal, and a lubricator body secured to said holder, resilient means for biasing said holder for movement toward the journal, when the lubricator device is mounted in operative relation to the journal, said body comprising a length of capillary material having a rectangular transverse cross-sectional configuration throughout its length, said holder comprising a tubular member including a curvilinear central portion and rectilinear end portions, said body being received in said tubular member and said tubular member being proportioned to closely receive said body and curving to define concave and convex surfaces in the respective wide sides of said body, and means for slidably mounting said holder on said trackway when the device is mounted in operative relation to the journal, including means for positioning and maintaining the positioning of said body and holder with respect to the journal, when the device is mounted in operative relation to the journal, such that the long dimension of said rectangular cross-sectional configuration extends longitudinally of the journal with one end of the body disposed adjacent to the journal and the other end extending into the lubricant reservoir.

References Cited in the file of this patent

UNITED STATES PATENTS

| | | |
|---|---|---|
| 92,378 | Shoenfelt | July 6, 1869 |
| 104,821 | Beam | June 28, 1870 |
| 2,205,617 | Coolidge | June 25, 1940 |
| 2,640,740 | Harkenrider | June 2, 1953 |
| 2,738,242 | Harkenrider | Mar. 13, 1956 |

FOREIGN PATENTS

| | | |
|---|---|---|
| 13,849 | Great Britain | 1905 |